April 9, 1963  M. E. SIBERT  3,085,052
METHOD FOR MAKING FILM CAPACITORS
Filed Sept. 9, 1960
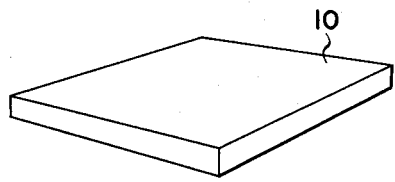
Fig. 1
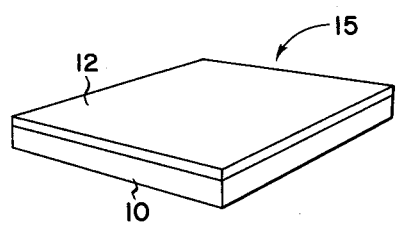
Fig. 2
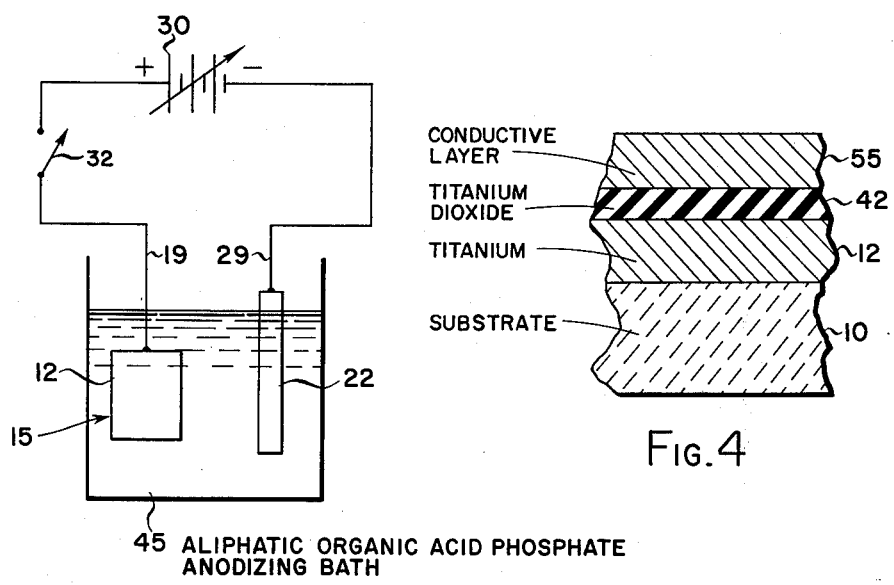
Fig. 3
Fig. 4
INVENTOR.
MERLE E. SIBERT
BY
Agent

United States Patent Office 3,085,052
Patented Apr. 9, 1963

3,085,052
METHOD FOR MAKING FILM CAPACITORS
Merle E. Sibert, Menlo Park, Calif., assignor to Lockheed Aircraft Corporation, Burbank, Calif.
Filed Sept. 9, 1960, Ser. No. 55,089
7 Claims. (Cl. 204—38)

This invention relates generally to the manufacture of film capacitors, and more particularly to an improved method and apparatus for making film capacitors by means of anodizing techniques.

As a result of the growing importance of microminiaturization in present-day electronics, considerable effort is being expended in the search for high quality miniaturized capacitors and improved techniques for their manufacture. Recently, attention has been given to film capacitors because of their inherent simplicity and compactness. However, the provision of high quality film capacitors for microminiaturization has proved to be a most difficult problem, requiring expensive and complicated methods and apparatus, which as far as is now known are still not entirely satisfactory, particularly where good uniformity and high temperature operation are necessary.

It is the broad object of the present invention, therefore, to provide an improved method and apparatus for making high quality film capacitors capable of operating at very high temperatures.

A more specific object of this invention is to provide an improved method and apparatus for making high quality film capacitors by the use of anodizing techniques.

Another object of this invention is to provide a new anodizing bath for titanium.

A further object of this invention is to provide a method and apparatus in accordance with the above mentioned objects which is simple, relatively inexpensive and which can be adapted for automatic or semi-automatic techniques.

In a typical embodiment of a method and apparatus in accordance with the invention a film capacitor is produced by anodizing a titanium layer coated on a suitable substrate in an aliphatic organic acid phosphate anodizing bath to form a stoichiometric oxide film thereon which serves as the capacitor dielectric, the unanodized portion of the titanium layer serving as one plate of the capacitor and a copper layer vacuum deposited on the stoichiometric oxide serving as the other plate of the film capacitor.

The specific nature of the invention as well as other objects, uses and advantages thereof will clearly appear from the following description and the accompanying drawing in which:

FIGS. 1 and 2 are perspective views illustrating initial steps in the fabrication of a film capacitor in accordance with the invention.

FIG. 3 is a diagrammatic view of a titanium coated substrate being anodized in an aliphatic organic acid phosphate anodizing bath to form a dielectric surface layer in accordance with the invention.

FIG. 4 is a fragmentary cross-sectional end view of a film capacitor fabricated in accordance with the invention.

Like numerals designate like elements throughout the figures of the drawing.

As is well known, anodizing involves the electrochemical modification of the surface of a metal by immersing a suitable metal in an anodizing bath, the metal serving as the anode of an electric circuit through which an anodizing current is passed. The electro-chemical modification of the metal surface resulting from anodizing ordinarily appears as an oxide film or coating thereon. Anodizing has found its primary use in connection with aluminum or aluminum alloys for providing corrosion protection. Also, various other metals such as zinc, magnesium and titanium have been subjected to anodizing for various purposes. The anodizing baths most widely used are chromic acid baths, sulphuric acid or oxalic acid baths, and boric acid baths.

Only a relatively small number of metals have been satisfactorily anodized and a relatively small number of different types of anodizing baths are known, chiefly because it has not been possible to reliably predict the adequacy of a particular anodizing bath for a particular metal.

The use of anodizing to convert the surface of a metal into an oxide layer for the purpose of making a capacitor is not in itself new and this possibility has been considered by those skilled in the art for microminiaturization purposes. However, using known anodizing baths, it has not heretofore been possible to obtain a dielectric surface layer having really satisfactory properties for practical use in microminiaturization circuitry. For example, known anodizing techniques form dielectric films having relatively poor uniformity and adherence, high porosity, and high loss characteristics. Also, such dielectric films are plagued with pinhole problems making it most difficult to apply the outer electrode layer without shorting out the capacitor. The problem of uniformity is an especially critical one where the resulting capacitor is intended for use in distributed parameter networks as in molecular microelectronics circuitry.

In accordance with the present invention, it has been discovered that the anodization of titanium in an aliphatic organic acid phosphate bath is capable of producing a stoichiometric titanium dioxide surface film thereon which is ideally suited to serve as the dielectric of a film capacitor in that it is highly uniform and adherent, is pinhole free, has a high dielectric constant and has a low loss and a low porosity.

In order to provide a full understanding of the invention, the following illustrative description of a typical fabrication of a film capacitor in accordance with the invention will now be presented using FIGS. 1–4. It is to be understood, however, that this description is only for illustrative purposes and is not to be considered as limiting the scope of the invention.

FIG. 1 shows an alumina substrate 10 which is coated with a uniform layer of titanium 12 as shown in FIG. 2 having a resistivity of the order of 0.2 to 15 ohms per square. The titanium coating may be provided by a method such as is disclosed in U.S. Patent No. 2,746,888, but the method preferred is that disclosed in the commonly assigned copending patent application Serial No. 8,157, filed February 11, 1960, now Patent No. 3,022,201.

The resulting titanium coated substrate 15 shown in FIG. 2 is first cleaned in a suitable cleaning solution such as hydrogen fluoride and is then subjected to anodizing as diagrammatically illustrated in FIG. 3. The substrate 15 is immersed in an aliphatic organic acid phosphate anodizing bath 45 with a lead 19 suitably soldered to the titanium layer 12 to support the substrate 15 in the bath 45 and permit the titanium layer 12 to be connected through a power switch 32 to the positive side of an adjustable D.-C. power source represented by the adjustable battery 30. The negative side of the battery 30 is connected through a lead 29 to a titanium rod 22 inserted in the bath 45 and serving as a cathode.

The starting current density and the final forming voltage and current are then appropriately chosen in the anodizing process illustrated in FIG. 3 to produce the desired dielectric film on the titanium layer 12. Of course, as is well known in anodizing, care must be taken to prevent or minimize arcing and the applied voltage must be slowly increased to its final value to prevent excessive current flow. On completion of anodizing the substrate 15 is water-washed and dried. The anodized film produced will then be a high quality dielectric layer.

An outer electrode layer of copper is now vacuum evaporated on the anodized film to complete fabrication of the film capacitor. Obviously, other metals besides copper could be used and other methods such as plating, sputtering and the like could be used for deposition besides vacuum evaporation.

FIG. 4 is a fragmentary cross-sectional end view showing the completed film capacitor. In FIG. 4 the layer 10 is the substrate, the layer 12 is the unconverted titanium thereon and serves as one plate of the capacitor, the film 42 is the oxide film produced by anodizing and serves as the dielectric of the capacitor, and the layer 55 is the vacuum evaporated copper outer electrode layer serving as the other plate of the capacitor.

Of the aliphatic organic acid phosphates of which the bath 45 in the anodizing arrangement of FIG. 3 is comprised, solutions of the aliphatic organic acid phosphates having fewer than 5 carbon atoms have been found preferable, particularly the ethyl acid phosphates. These solutions may include water and/or a miscible alcohol.

Of these ethyl acid phosphates, aqueous solutions of ethyl dihydrogen phosphate $C_2H_5PO_2(OH)_2$, ethyl monohydrogen phosphate $(C_2H_5)_2PO_3(OH)$, or mixtures thereof in concentrations ranging from 3–95% by volume, but preferably 25–50% by volume, have performed particularly well as anodizing baths for producing a high quality dielectric film on a titanium surface.

A few examples of anodizing baths and anodizing schedules which have been successfully employed are as follows:

*Example I*

| | |
|---|---|
| Ethyl dihydrogen phosphate | 50% by volume. |
| Water | 50% by volume. |
| Starting current density | 300–400 milliamperes/decimeter$^2$. |
| Forming voltage | 150–400 volts. |
| Final current | Less than 10 milliamperes. |

*Example II*

| | |
|---|---|
| Ethyl hydrogen phosphate | 90% by volume. |
| Water | 10% by volume. |
| Starting current density | 300–400 milliamperes/decimeter$^2$. |
| Forming voltage | 200–400 volts. |
| Final Current | Less than 2 milliamperes. |

*Example III*

| | |
|---|---|
| Ethyl dihydrogen phosphate | 30% by volume. |
| Water | 70% by volume. |
| Starting current density | 100–150 milliamperes/decimeter$^2$. |
| Forming voltage | 200–400 volts. |
| Final Current | Less than 50 milliamperes. |

*Example IV*

| | |
|---|---|
| Ethyl hydrogen phosphate | 25% by volume. |
| Ethyl alcohol $C_2H_5OH$ | 75% by volume. |
| Starting current density | 150–200 milliamperes/decimeter$^2$. |
| Forming voltage | 250–300 volts. |
| Final Current | Less than 20 milliamperes. |

*Example V*

| | |
|---|---|
| Methyl hydrogen phosphate $(CH_3)_2HPO_4$ | 15% by volume. |
| Water | 85% by volume. |
| Starting current density | 120–200 milliamperes/decimeter$^2$. |
| Forming voltage | 200–300 volts. |
| Final Current | Less than 25 milliamperes. |

Film capacitors produced by the specific baths described above have capacitance values of the order of 0.001 to 0.10 microfarad per square centimeter, a breakdown voltage of the order of one-third of the forming voltage, and a dissipation factor of the order of 0.01 to 0.10.

It is to be understood in connection with this invention that the method and examples described herein are only exemplary and that various modifications may be made without departing from the scope of the invention as defined in the appended claims.

I claim as my invention:

1. A method of making capacitors which comprises anodizing a titanium surface in an alkyl acid phosphate bath, wherein the alkyl radical has less than 5 carbon atoms, so as to form a stoichiometric titanium dioxide film thereon, and forming an outer conductive layer on the stoichiometric titanium dioxide film.

2. A method for making film capacitors which comprises coating a substrate with a layer of titanium, anodizing the titanium layer in an alkyl acid phosphate bath, wherein the alkyl radical has less than 5 carbon atoms, so as to form a stoichiometric titanium dioxide film, and forming an outer conductive layer on the stoichiometric titanium dioxide film.

3. The invention in accordance with claim 2, wherein said bath is an ethylacid phosphate solution.

4. The invention in accordance with claim 3, wherein said solution essentially comprises an ethyl acid phosphate and water.

5. The invention in accordance with claim 3, wherein said solution essentially comprises a miscible mixture of an ethyl acid phosphate and an alcohol.

6. The invention in accordance with claim 2 wherein said bath is an aqueous ethyl hydrogen phosphate solution having a concentration of 3–95% by volume.

7. The invention in accordance with claim 2 wherein said bath is an aqueous ethyl dihydrogen phosphate solution having a concentration of 3–95% by volume.

References Cited in the file of this patent

UNITED STATES PATENTS 2,874,102     Wainer     Feb. 17, 1959

OTHER REFERENCES

Chemical Abstracts, volume 50 (1956), page 3851; abstract of article in J. Gen. Chem. U.S.S.R., volume 25 (1955), pages 656–660.